Nov. 25, 1969  E. B. DONNELL, JR., ET AL  3,480,505
HEAT SEALING
Filed April 8, 1966
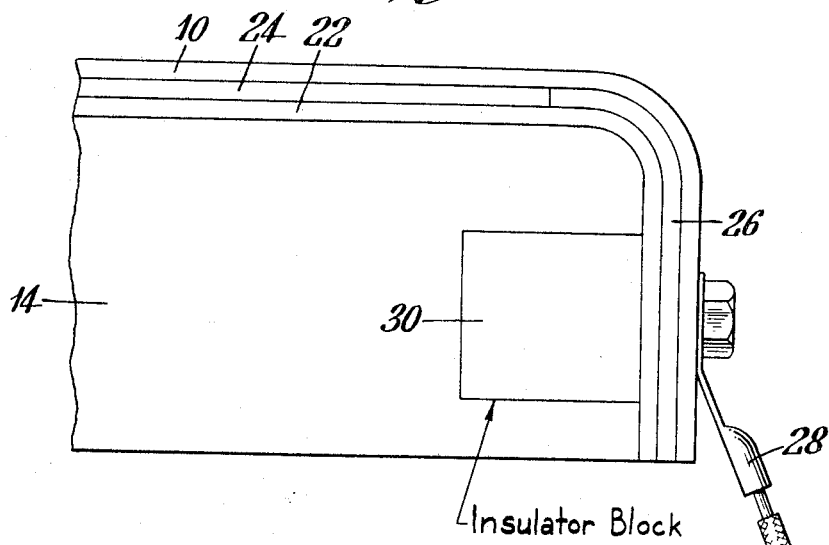
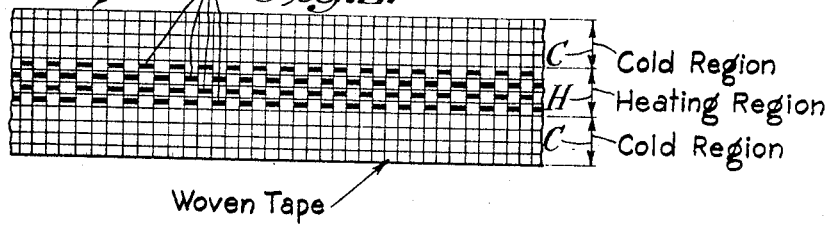
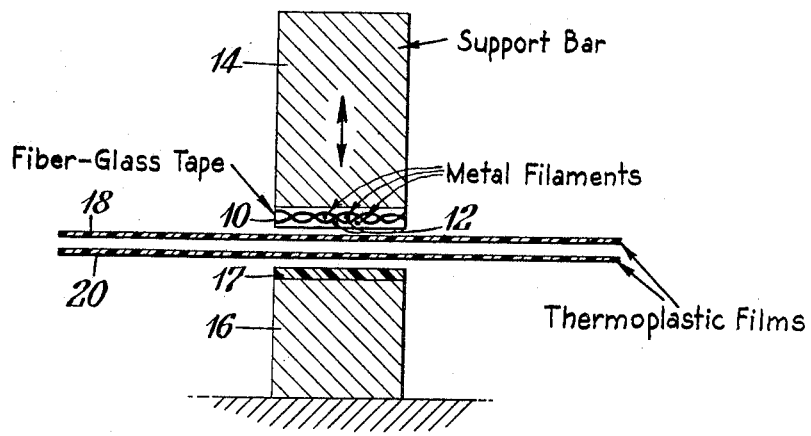
INVENTORS
E. BRADFORD DONNELL, JR.
WILLIAM L. CALVERT
BY
ATTORNEY United States Patent Office 3,480,505
Patented Nov. 25, 1969

3,480,505
HEAT SEALING
Emerson Bradford Donnell, Jr., Neshanic, and William L. Calvert, Westfield, N.J., assignors to Union Carbide Corporation, a corporation of New York
Continuation-in-part of application Ser. No. 478,348, Aug. 9, 1965. This application Apr. 8, 1966, Ser. No. 541,121
Int. Cl. B32b 31/00; H05b 3/34
U.S. Cl. 156—498                9 Claims

ABSTRACT OF THE DISCLOSURE

A heat sealing apparatus and method utilizing impulse type heat sealing filaments interwoven into a woven non-conductive member wherein the interwoven filaments comprise a heating or sealing region which is flanked by two cold regions made up by the woven member.

---

This application is a continuation-in-part of copending application Ser. No. 478,348, filed Aug. 9, 1965 and now abandoned.

This invention relates to the welding of thermoplastic films and, more particularly, to the method and apparatus for lap welding plies of thermoplastic film through the use of heat and pressure.

Conventional welding or heat sealing equipment is capable of sealing together thermoplastic films and producing seals which are equal in strength to the strength of the film. However, the inability to consistently produce maximum strength seals because of the inability to control penetration of the heat sealer into the film, and because of inherent fragility of certain sealing devices, has been a major problem.

The use of "impulse sealing" equipment is a common practice. This consists of bringing a ribbon or wire of a metallic electrical heating element, such as a Nichrome wire, down against the layers of film to be joined. The metallic heating element may be covered by a membrane having electrical insulating and antisticking properties, while the films can be supported by a cushioned back-up member. A pulse of electric current is applied to the heating element causing it to heat and fuse the plastic members together. The heating element cools immediately upon the cessation of the electric current, thus permitting the fused joint to solidify while a clamping pressure is maintained. The duration of the cooling time under pressure is typically about twice the duration of the heating time. Sealing cycle speed and seal quality are affected by such factors as heat capacity of the heating element (thermal inertia), heat transfer rates, uniformity of pressure and heat pulse, flatness and alignment of the surfaces between which the plastic members are clamped, and the extent to which the heating element tends to cut or burn through the joint thereby weakening it.

It is customary to spring load the heating element at one or both ends in order to prevent kinking of the element due to thermal expansion during the heating pulse. The seals produced by conventional impulse sealing equipment are generally short in length and straight since spring tensioning of a long and/or curved element is not practical. The need to allow for thermal expansion of the heating element precludes the rigid bonding of the element to a support bar and the precise recessing of the element into a groove in a support bar to prevent excessive penetration of the element into the heated film. The use of a resilient cushion under the film, for cooperation with the heating element, does not completely solve the latter problem and makes vulnerable the already fragile element to abuse encountered in normal use and handling.

A heat-seal joint between thermoplastic film plies is considered of optimum strength when the yield strength of the seal exceeds the yield strength of the individual parent film plies. Optimum heat-seal strength is obtained in an elongate welded lapped joint of polyolefin films such as polyethylene, when optimum temperature and sealing pressure are uniformly transmitted along the extent of the seal area and are maintained for an optimum sealing time interval.

Optimum sealing pressure is that which is sufficient to ensure intimate contact of the film plies at their interface and which provides sufficient force to fuse the softened thermo-plastic. Thus, according to the invention, the film plies are clamped flat before sealing. The sealing temperature and pressure are, at the same time, kept to optimum values to produce uniformly strong seals.

To obtain a uniformly strong weld or seal, we have found that a uniform pressure should be applied to the film plies adjacent the seal and maintained for a selected interval of time after removal of the fusion heat to prevent spring-back and permit the material in the seal to cool and consolidate the film plies.

In accordance with the prevent invention, a plurality of layers of thermoplastic film are heat-sealed together by an impulse-heat sealing process which involves supporting the layers of thermoplastic films, pressing the layers of films together to provide intimate contact between the surfaces of the films, simultaneously or sequentially heating the films to their fusion temperature and maintaining the layers of films under pressure during a cooling period. The pressure is uniformly applied along a zone which includes the region in which the films are heated and a cooling region which surrounds the heated region.

Broadly, the heat sealing apparatus of this invention for sealing a plurality of layers of thermoplastic film includes a rigid support bar, said support bar being a heat sink, a woven, electrically non-conductive member carried by said support bar, a plurality of electrically conductive filaments interwoven with said woven non-conductive member, and means to electrically heat the filaments. The interwoven electric heating filaments can attain heat sealing temperatures by the intermittent application of impulse level voltage such as that employed in the impulse heat sealing art, or they can be preheated for longer filament life by a low applied voltage followed by the application of impulse level voltage, or they can be continuously maintained at the desired sealing temperature, again for longer filament life, by the application of a steady voltage which is generally less than impulse level voltage.

The objects and advantages of this invention will be appreciated and the invention will be understood better from the following specification taken in connection with the accompanying drawings in which:

FIGURE 1 is a fragmentary elevational view of an impulse-heat sealing bar according to the invention;

FIGURE 2 is a fragmentary plan view of a woven-tape with interwoven impulse-heating filaments; and FIGURE 3 is a sectional view of an impulse-heat sealing apparatus.

FIGURE 2 shows a woven tape or ribbon 10, of an electrically insulating and thermally resistant material, such as fiber glass, asbestos or quartz. A plurality of strands, or filaments of an electrically conductive material 12, are interwoven with the ribbon 10. The filaments 12, having proper electrical resistance, constitute the heating means and the width, H, of these filaments determines the width of the heat seal or weld which is produced by the device of the invention. The woven tape can be impregnated with thermally resistant resin of a semi-resilient nature. The zone or region indicated as H, for convenience shall be referred to hereinafter as the heating region whereas the adjacent areas, indicated as C, shall be referred to as the cold regions.

As seen in FIGURE 1, the tape 10 is carried by a rigid support 14. The overall width of the tape 10 is substantially greater than that of the heating region, H. Typically, the width of the tape and the support bar can range from about one-quarter inch to about one inch, whereas the heating region can range from about one-sixteenth to one-quarter of an inch. The dimensions employed in any system will depend upon the required seal width, the sealing temperatures and size limitations imposed by integral equipment.

The cold regions, C, are composed essentially of the same material as the heating region, H, and consequently exhibit the same degree of hardness as the region H. Therefore, the thermoplastic sheets, 18 and 20, which are held together under pressure, between the backup member 16 and the bar 14 will be substantially uniformly compressed across the entire width of the two members 14 and 16. The penetration of the hot region, H, into the film is thus limited because of the distribution of the pressure over an area much greater than the area of the heating region itself. The cold regions, C, not only serve as a control over the penetration of the heating elements into the film, but also serve to prevent excessive thinning of the sheets at the weld. Thermoplastic material when heated to its fusion temperature cannot support a heated sealing surface without flowing and consequently thins down to some extent. The thermoplastic sheets under the cold regions are under the same pressure, but have a much lower temperature than the thermoplastic sheets under the heating zone, thus preventing the flow to the thermoplastic material away from the heated region.

Although the heating region H and the cold regions C, have been shown as being co-planar, a spacing element having a width about equal to the width of the heating region H, can be positioned between the tape 10 and the support 14, in order to increase the degree of penetration of the heating elements 12, into the thermoplastic sheets. The spacing element can be either a resilient or a rigid member, but the use of a rigid member is preferred.

The filaments 12, must have a high enough melting point and oxidation resistance to permit high temperatures to be used and to have a long period of usefulness.

The interweaving of the heating filaments with the electrically non-conductive member has the essential advantage of permitting the heating filaments to expand and contract during the heating and cooling cycles without effecting the pressure which can be exerted by the heating element against the films at the point where the seals are being made and without causing breaks in the filaments.

The resistivity of the filament material, the manner in which the filaments attain heat sealing temperatures, the specific heat capacity of the filament material, the interwoven non-conductive fibers and the impregnating resin, the thickness, heat conductivity and specific heat capacity of the electrical insulating material, 22, FIG. 2, the total active length of the element, the available voltage and current, the total thickness and sealing properties of the plastic film to be joined, and the allowable time to make a seal are all intimately related and have various effects on each other when changed.

For example, as more fully set forth in Examples 17–20, a tape consisting of five strands of five-ply, carbon yarn incorporated as a five-sixteenth of an inch wide strip down the center of a three-quarter inch wide woven glass tape, in which the carbon yarn had an effective length of approximately thirty inches, exhibited an electrical resistance of 60 ohms and required an applied voltage of 130 volts and a pulse time of from 2.5 to 5 seconds to produce effective seals in four-ply 2 mil, low density polyethylene film. The thermal inertia of the element alone (no impregnating resin in this case), as determined from its mass and specific heat is about one-third that of conventional Nichrome elements employed in conventional impulse sealers, thus permitting faster cycles. However, the voltage required is considerably high. The electrical resistivity of metals such as tungsten, rhodium, beryllium, molybdenum, iridium, ruthenium, osmium and palladium is far below that of graphite and permits the use of lower voltages. The low thermal inertia of sealing elements made from these metals is predominately due to the fact that their electrical resistivity is in a range which permits the use of a filament of smaller cross-sectional area than is required with graphite and consequently of lower mass.

In addition to a low thermal inertia the material of the filament must have a high enough oxidation resistance to provide a long lasting consistent value element and a high enough tensile strength to permit the filament to be interwoven with the insulating material, such as fiber glass. Electrical resistivity, melting point and tensile strength properties of tungsten are excellent, but the oxidation resistance is undesirably low. It has been found that the gold plating of a tungsten filament will extend the life of the element by preventing the oxidation of the tungsten.

As shown in FIGURE 1 the heating element 10 which is rigidly carried by the support bar 14 is conveniently secured to the bar by an insulating tape. A first tape 22, having one or both sides coated with a pressure sensitive adhesive is secured to the bar 14. A second insulating tape 24, which has pressure sensitive adhesive on one or both sides depending on which is used in the first layer or layers is secured to the first tape 22; a conductive material 26, such as copper, silver, gold, or the like is applied at the ends of woven element tape. The heating element 10 is secured across the entire length of the bar 14. The heating element 10 is connected to a source of electricity at each end, by means of leads, 28. The end of the heating elements, leads, etc., are insulated from the support bar by means of an insulator block 30. The support bar 14 can be cooled as for example by circulating water, in order to provide for the rapid cooling of the heating element 10. The bar 14 can thus function very effectively as a heat sink. The highly conductive section of the element, 26, has a much lower electrical resistance than the heating element 10, so that the heating element remains relatively cool in this region. This serves primarily to prevent the formation of a "hot-spot" at the ends of the heating element at the point where the element ceases to be in physical contact with the film, 18 and 20. The hot-spot would normally result from lack of sufficient heat removal from the element where physical contact between element and film is insufficient or nonexistent.

A non-sticking coating or layer, can be applied over the outermost surface of the heating element 10, in order to prevent the element from adhering to the heated film. Polytetrafluoroethylene alone or impregnated in fiber glass tape can be conveniently employed for this purpose.

The heat-sealing operation involves placing a plurality of sheets of thermoplastic materials shown as 18 and 20, in FIGURE 3, between the heating element and the back-up member 16. The back-up member, preferably, has a resilient member on its outer surface to allow for variations in film thickness and to reduce the perfection required in the flatness of all surfaces under compression. The support bar 14 is forced downwardly (as oriented in FIGURE 3) with the requisite amount of pressure and the interwoven filaments are heated to the required heat sealing temperature as described previously to heat seal the films, 18 and 20 together. When impulse voltage is applied, an impulse period of about 0.5 to 3 seconds provides the desired results. The pressure is maintained until the films have cooled adequately. The dwell period, that is, the length of time the heating element is in contact with the film, is normally as short as possible, and will vary depending upon the physical characteristics of the materials being fused together, the thermal inertia of the sealing device including the hot region, H, the back-up members 16 and 17 and the initial temperature of the support bar 14. Typically, dwell periods of from about 1 to 10 seconds are employed.

EXAMPLES 1–15

The consistency of impulse sealing bars having a woven tungsten heating element, and the effect of impulse time, dwell time and impulse voltage upon the strength of seals made by the bars is shown in the following examples.

Two layers of two mil polyethylene film were fed through a bag making apparatus. The movement of the film through the apparatus is sequentially stopped to permit a longitudinal bar (Bar II) having a 42 inch effective length, and a transverse bar (Bar I) having a 39.5 inch effective length, to be lowered and forced against the film for the requisite length of time. A pressure of 15 pounds per square inch (p.s.i.) was exerted against the film by the bars.

The length of travel of the film through the bag making apparatus, during one cycle was less than the effective length of the longitudinal heat sealing bar, thus causing the bar to reheat and, in effect, produce a double sealing, in a portion of the longitudinal seal. In Table I, column B, under Bar I, strengths of seals which were twice heat-sealed, are listed.

A test of the durability of the Bar I was made by running the bar substantially continuously for 83,531 cycles. The impulse time was 2 seconds the terminal voltage, 60 volts, and the dwell time 2 seconds. The interface pressure was 15 p.s.i.

The bar was examined and found to be in good condition.

The life of a woven-tungsten tape-heat sealing bar can be extended appreciably by gold or platinum plating the tungsten wire in order to preclude oxidation of the tungsten wire. Also, the entire tape can be potted in a high temperature resin, in order to prevent the tungsten from contacting the air (oxygen) and provide better heat transfer away from the tungsten wire.

TABLE I

| Example No. | Impulse time (sec.) | Impulse voltage | | Dwell time (sec.) | Seal strength (90° tear) (pounds) | | |
|---|---|---|---|---|---|---|---|
| | | Bar I | Bar II | | Bar I | | Bar II |
| | | | | | A | B | |
| 1 | 2 | 65 | 80 | 6.75 | 6.8 | 6.9 | 9.8 |
| 2 | 2.5 | 70 | 86 | 6.75 | 6.7 | 6.8 | 10.2 |
| 3 | 1.5 | 60 | 74 | 6.75 | 5.0 | 6.1 | 4.6 |
| 4 | 2.5 | 65 | 80 | 9.0 | 6.9 | 7.0 | 10.3 |
| 5 | 1.5 | 65 | 80 | 4.5 | 6.6 | 6.7 | 6.6 |
| 6 | 2.0 | 70 | 86 | 9.0 | 6.7 | 6.7 | 10.0 |
| 7 | 2.0 | 65 | 80 | 6.75 | 6.7 | 6.8 | 10.4 |
| 8 | 2.0 | 60 | 74 | 4.5 | 6.7 | 6.7 | 9.2 |
| 9 | 2.5 | 70 | 86 | 9.0 | 8.8 | 6.7 | 10.4 |
| 10 | 2.5 | 70 | 86 | 4.5 | 7.0 | 7.0 | 10.4 |
| 11 | 2.5 | 60 | 74 | 4.5 | 6.7 | 6.8 | 10.2 |
| 12 | 1.5 | 60 | 74 | 4.5 | 6.4 | 6.7 | 5.6 |
| 13 | 1.5 | 60 | 74 | 9.0 | 5.9 | 5.5 | 5.3 |
| 14 | 1.5 | 70 | 86 | 9.0 | 6.7 | 6.8 | 8.3 |
| 15 | 2.0 | 65 | 80 | 6.75 | 6.9 | 6.9 | 9.4 |

The bars were constructed of aluminum and had phenolic laminate insulator blocks at each terminal end. A fiber glass woven tape having a weave pattern designated as Bally Ribbon Mills pattern 9764½, was secured to the aluminum bar and insulated therefrom by means of a layer of double faced masking tape and two layers of single faced masking tape. Bundles of ten wires each were interwoven with the fiber glass. The wires were .8 mil diameter tungsten wires. The woven tungsten heating element exhibited a room temperature resistance of approximately one ohm per 42 inches of length. The overall width of the tape was ½ of an inch and the width of the centrally positioned heating region was about ⅛ of an inch. The aluminum bars were maintained in contact with a water cooled element through which water was circulated at a temperature of 26° C. in Examples 1–7 and at 30° C. in Examples 8–15.

The tape was maintained in firm contact with a layer of heavy aluminum foil (element 26 of FIGURE 1) at each terminal end. The aluminum foil was secured to, and insulated from the aluminum bar by means of a layer of double faced masking tape and a layer of single faced masking tape. The woven-tungsten element was covered with an outer layer of polytetrafluoroethylene tape.

The terminal ends of the woven-tungsten tape were impregnated with silver-filled epoxy resin in order to provide good electrical contact between the tungsten wires and the aluminum foil.

Seal strengths were ascertained by the method as described in a "Modern Packaging," December 1956, article, entitled "The Molten Bead Sealer," by H. G. Chinn. A one inch wide sample is peeled in a direction perpendicular to the seal to determine peel strengths and at 45° to the seal to determine tear-strengths. The seal strength is measured in pounds of force required to pull apart the two layers of film at the seal.

The similarity of seal strengths of the twice sealed seals produced by two separate impulse applications (Bar I, column B) and once sealed seals produced by the normal, single application (Bar I, column A) can be attributed to the fact that the impulse-sealing apparatus does not cause the thinning and weakening of the film in the area of the seal.

The similarity of seal strengths in Examples 1, 8 and 15 can be attributed at least in part to the accurate control of impulse time which can be achieved. In conventional impulse sealers, the electric impulse must be started before the heating element is in contact with the film in order to pre-expand the element. The electric impulse period in the present invention is the period of the heat sealing operation, without any pre-expansion period. The woven filaments 12 are capable of distributing uniformly along the entire length of each filament, the motion resulting from thermal expansions or contractions. Although the capability obtained by interweaving the filaments 12 with the woven tape 10, are preferred, the filaments can be geometrically contoured in any desired manner which provides expansion and contraction compensation and thus eliminates overall length changes during heating and cooling cycles. Although a woven tape 10 is advantageously employed, other non-conductive carriers which permit for some slight motion between the filaments and the carrier, can be employed.

EXAMPLE 16

A woven-tungsten heat-sealing bar, of the type described in Examples 1–15, was employed, except in that at one terminal end, the tape was copper plated instead of being silver-epoxy filled. One hundred seals were made on four layers of 2 mil polyethylene film. A terminal voltage of 48 volts was maintained for 2.7 seconds during each cycle. A hot spot in the seals at the silver-epoxy filled terminal end indicated that the temperature of the copper plated terminal end was much lower than that of the silver-epoxy filled end. A lower electrical resistance at the copper plated end would account for the temperature difference between the two terminal ends.

EXAMPLES 17–20

Five strands of 5-ply, 450 denier carbon yarn, incorporated as a 5/16 inch wide heating region, in a 3/4 inch, 12 mesh, 30 mil thick woven glass tape. The tape had an effective length of 30 inches and an electrical resistance of 60 ohms. An applied voltage of 130 volts to produce seals was employed in 4 layers of 2 mil polyethylene. The entire tape was epoxy impregnated and the terminal ends were impregnated with a silver-filled epoxy. A pressure of 10 p.s.i. was applied in each case. The impulse times, dwell times, and seal strengths, are set forth in Table II.

TABLE II

| Example No. | Impulse time (sec.) | Dwell time (sec.) | Seal strength peel (90%) M.D./T.D. | (Pounds) tear (45%) M.D./T.D. |
|---|---|---|---|---|
| 17 | 2.5 | 3.5 | 2.4/4.5 | 1.2/1.8 |
| 18 | 3 | 4 | 5.6/8.1 | 1.8/2.4 |
| 19 | 4 | 5 | 5.7/7.7 | 1.1/2.4 |
| 20 | 5 | 4 | 5.6/7.8 | 1.5/2.3 |

The abbreviation M.D. indicates a machine direction seal, that is, one produced by a heat-sealing bar positioned longitudinally with respect to the direction of motion of the film through the heat-sealing apparatus, and T.D. indicates a transverse direction seal.

EXAMPLE 21

A sealing bar as described in Example 16, wherein the tungsten bundles were gold plated, was continuously heated with a terminal voltage of 31 volts. The heated bar was used to heat seal 4 ply, 2 mil polyethylene film using a dwell time of 4.5 seconds. Excellent, strong heat seals were effected in this manner and was repeated 3611 times with similar results.

The present invention has among its advantages, the ability to produce seals having non-linear configuration. For example, filaments can be woven into the tape in a complex embroidered design, or the tape 10 of FIGURE 2, can be curved in order to produce a curved seal.

Another advantage of the foregoing described heat-sealing device resides in the ability of each loop of the woven filaments 12 to act as an expansion loop thus eliminating the need to accommodate the overall expansion and contraction of the heating element. This eliminates the need to heat the heating element and put the element under tension before being pressed against the films to be sealed.

What is claimed is:
1. Heat sealing apparatus comprising:
(a) a rigid support bar;
(b) a woven, electrically non-conductive member carried by said support bar;
(c) a plurality of electrically conductive filaments interwoven with said woven non-conductive member and positioned to form a heating region substantially encompassed by cold regions of said woven non-conductive member free of said filaments, the overall width of said woven non-conductive member being greater than the width of said heating region, said filaments being adapted to expand and contract independently of pressure applied against said woven non-conductive member; and
(d) heating means for electrically heating said filaments to a sealing temperature.

2. Apparatus of claim 1 wherein the area of said heating region is from about one sixteenth to about one half of the area of said woven non-conductive member.

3. The apparatus of claim 1 wherein said filaments are tungsten.

4. The apparatus of claim 3 wherein said woven member is made of fiber glass.

5. Apparatus of claim 1 wherein said heating means are electric impulse heating means.

6. Apparatus of claim 5 wherein said impulse heating means are adapted to be preheated.

7. Apparatus of claim 1 wherein said heating means are adapted to be electrically heated continuously.

8. Apparatus of claim 1 wherein said filaments have expansion loops uniformly distributed along their lengths so as to distribute uniformly along the entire length of each filament, the motion resulting from thermal contractions or expansions, whereby said filaments are expansion and contraction compensated and do not exhibit overall length changes during heating and cooling cycles.

9. Heat sealing apparatus comprising:
(a) a rigid support bar, said support bar being a heat sink;
(b) a woven, fiber glass tape carried by said support bar;
(c) a plurality of tungsten filaments interwoven with said tape and providing a heating region, the tungsten filament free regions substantially encompassing said heating region and providing cooling regions, said cooling regions together being at least twice the width of said heating region, said filaments being adapted to expand and contract independently of pressure applied against said woven, fiber glass tape; and
(d) impulse heating means for electrically heating said tungsten filaments to a sealing temperature.

References Cited

UNITED STATES PATENTS

| | | | |
|---|---|---|---|
| 2,509,439 | 5/1950 | Langer | 156—311 XR |
| 2,650,183 | 8/1953 | Langer | 156—306 XR |
| 2,698,273 | 12/1954 | Miner et al. | 156—306 XR |
| 2,732,479 | 1/1956 | Rowland | 338—208 XR |
| 2,796,913 | 6/1957 | Fener et al. | 156—306 XR |
| 2,938,992 | 5/1960 | Crump | 219—46 |
| 2,985,860 | 5/1961 | Morey | 338—208 |
| 3,005,402 | 10/1961 | Starger et al. | 100—93 |
| 3,332,204 | 7/1967 | Frank | 53—180 |
| 3,348,474 | 10/1967 | Virta et al. | 100—93 |

HAROLD ANSHER, Primary Examiner

D. J. FRITSCH, Assistant Examiner

U.S. Cl. X.R.

156—583; 219—545; 338—208